United States Patent [19]
Kijima et al.

[11] Patent Number: 5,009,448
[45] Date of Patent: Apr. 23, 1991

[54] VEHICLE SUSPENSION SYSTEM

[75] Inventors: Takao Kijima; Takeshi Edahiro; Toshihide Koyama; Haruyuki Taniguchi, all of Hiroshima, Japan

[73] Assignee: Mazda Motor Corporation, Hiroshima, Japan

[21] Appl. No.: 343,820

[22] Filed: Apr. 27, 1989

[30] Foreign Application Priority Data

Apr. 30, 1988 [JP] Japan .................. 63-108765

[51] Int. Cl.⁵ .............................................. B60G 7/02
[52] U.S. Cl. .................................. 280/673; 280/691; 267/33; 267/293
[58] Field of Search ............. 280/673, 671, 663, 690, 280/691, 692, 696; 267/293, 294, 33, 141.2, 141.3; 403/372, 365

[56] References Cited

U.S. PATENT DOCUMENTS 4,132,430  1/1979  Bantle .............................. 280/673

FOREIGN PATENT DOCUMENTS

| 253708 | 1/1988 | European Pat. Off. |
|---|---|---|
| 1937320 | 2/1971 | Fed. Rep. of Germany ...... 280/690 |
| 3619755 | 12/1986 | Fed. Rep. of Germany ...... 280/696 |
| 1253125 | 12/1960 | France . |
| 1341839 | 6/1963 | France . |
| 2355683 | 1/1978 | France . |
| 62-11203 | 3/1987 | Japan . |

Primary Examiner—Charles A. Marmor
Assistant Examiner—Karin Tyson
Attorney, Agent, or Firm—Sixbey, Friedman, Leedom & Ferguson

[57] ABSTRACT

A suspension system for a vehicle includes a suspension arm. The outer end portion of the suspension arm is connected to a wheel support for rotatably supporting a wheel. The inner end portion of the suspension arm is bifurcated and has first and second branch arms spaced from each other in the longitudinal direction of the vehicle body. Each of the inner end portions of the first and second branch arms is supported by a slide member so that the inner end portion is slidable relative to the vehicle body in the longitudinal direction of the same. A coil spring is provided for at least one of the first and second branch arms and urges forward the suspension arm. A stopper defines the foremost position of the suspension arm which is urged forward by said coil spring.

21 Claims, 4 Drawing Sheets

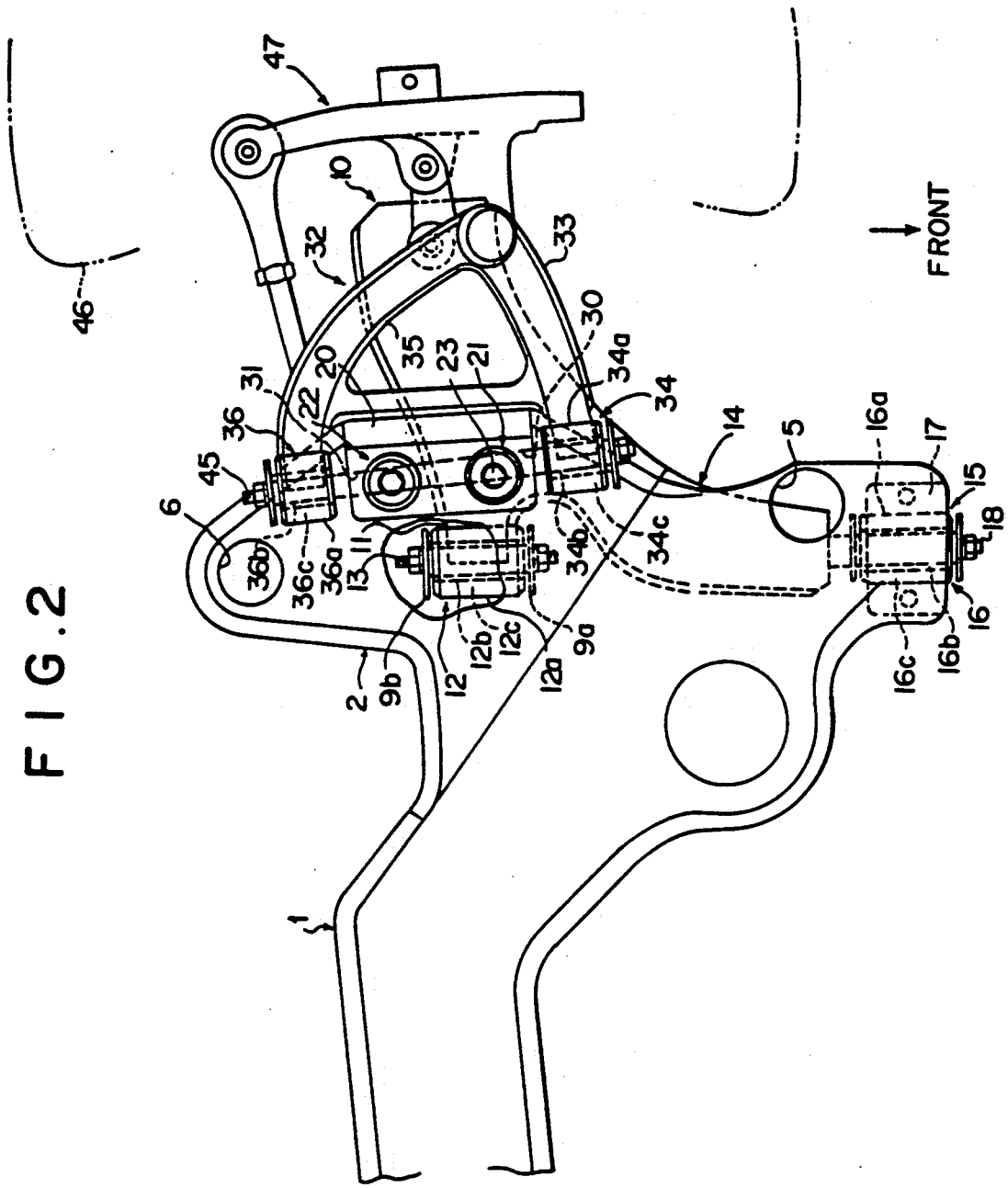

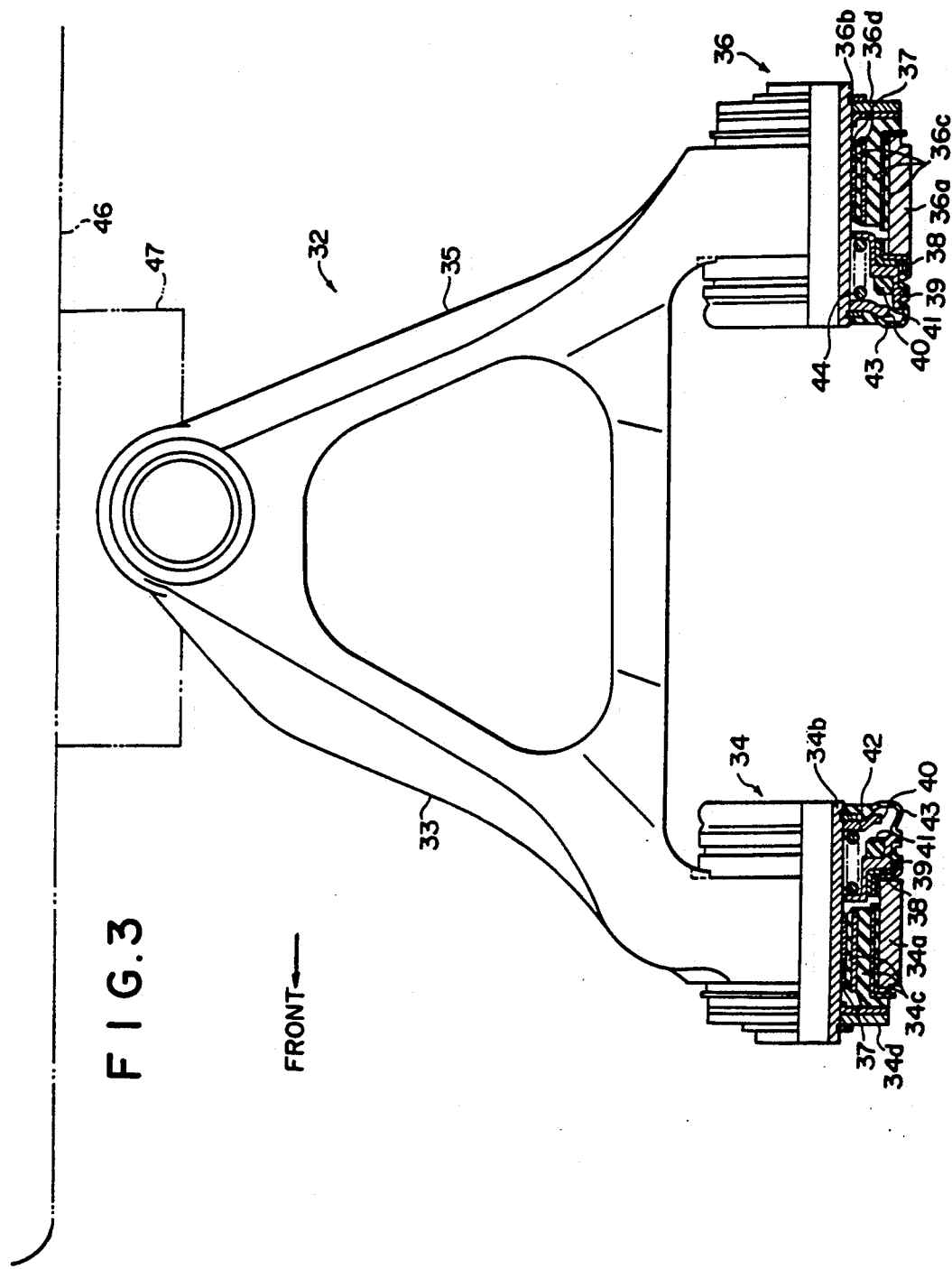

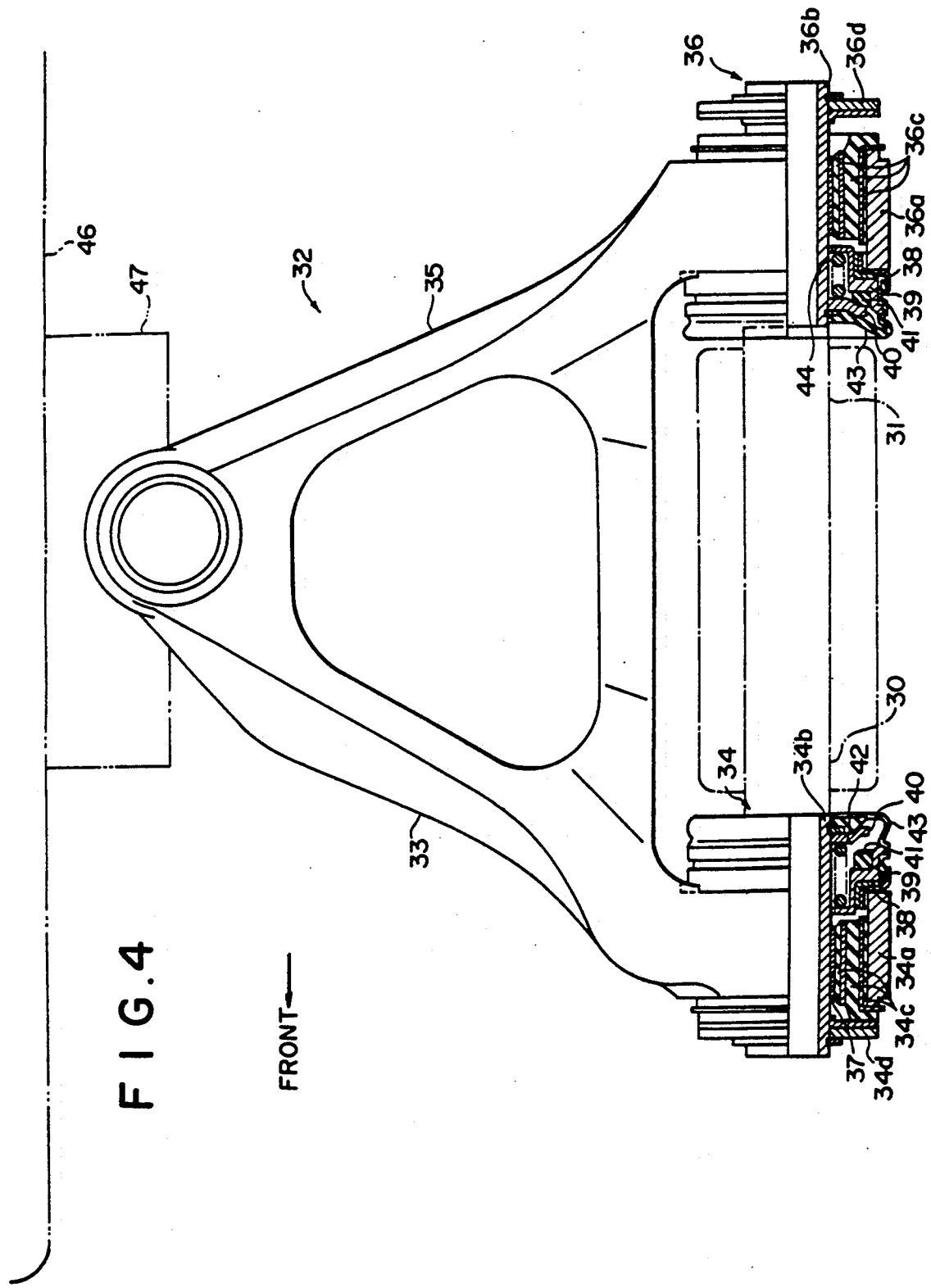

VEHICLE SUSPENSION SYSTEM

BACKGROUND OF THE INVENTION

1. Field of the Invention

This invention relates to a vehicle suspension system.

2. Description of the Prior Art

As disclosed, for instance, in Japanese Utility Model Publication No. 62(1987)-11203, there has been known a vehicle suspension system which has a suspension arm the inner end portion of which is bifurcated and comprises a front branch arm and a rear branch arm, and in which the inner ends of the branch arms are supported on the chassis so that the suspension arm can be displaced in the longitudinal direction of the vehicle body. The forward displacement of each branch arm is limited by a rubber bushing and forward load acting on the inner end of the suspension arm when the brake is applied is resiliently absorbed by the rubber bushing.

When a vehicle passes a gap, rearward load acts on the inner end of the suspension arm. In order to improve the driving comfort, it is preferred that the rearward load be resiliently absorbed. However, it is difficult to absorb the rearward load by a rubber bushing since the rubber bushing is hard to set to have a predetermined spring constant and the spring constant of the rubber bushing is apt to change with age. Further, it is difficult to ensure a sufficient displacement of the inner end of the suspension arm with the rubber bushing.

SUMMARY OF THE INVENTION

In view of the foregoing observations and description, the primary object of the present invention is to provide a vehicle suspension system which can resiliently absorb the rearward load acting on the inner end of the suspension arm when the vehicle passes a gap, thereby improving the driving comfort.

In accordance with the present invention, there is provided a vehicle suspension system comprising a suspension arm having an outer end portion which is connected to a wheel support for rotatably supporting a wheel and an inner end portion which is bifurcated and comprises first and second branch arms spaced from each other in the longitudinal direction of the vehicle body, a pair of slide members which respectively support the inner end portions of the first and second branch arms so that the inner end portions are slidable relative to the vehicle body in the longitudinal direction of the same, a coil spring which is provided for at least one of the first and second branch arms and urges forward the suspension arm, and a stopper means which defines the foremost position of the suspension arm which is urged forward by said coil spring.

BRIEF DESCRIPTION OF THE DRAWINGS

FIG. 2 is a plan view of the vehicle suspension system, FIG. 3 is a plan view of the upper arm with rubber bushings on the inner ends of the upper first branch arm and the upper second branch arm, and FIG. 4 is a plan view similar to FIG. 3 but showing the state after the upper arm is mounted on the chassis.

DESCRIPTION OF THE PREFERRED EMBODIMENT

Figure 1:
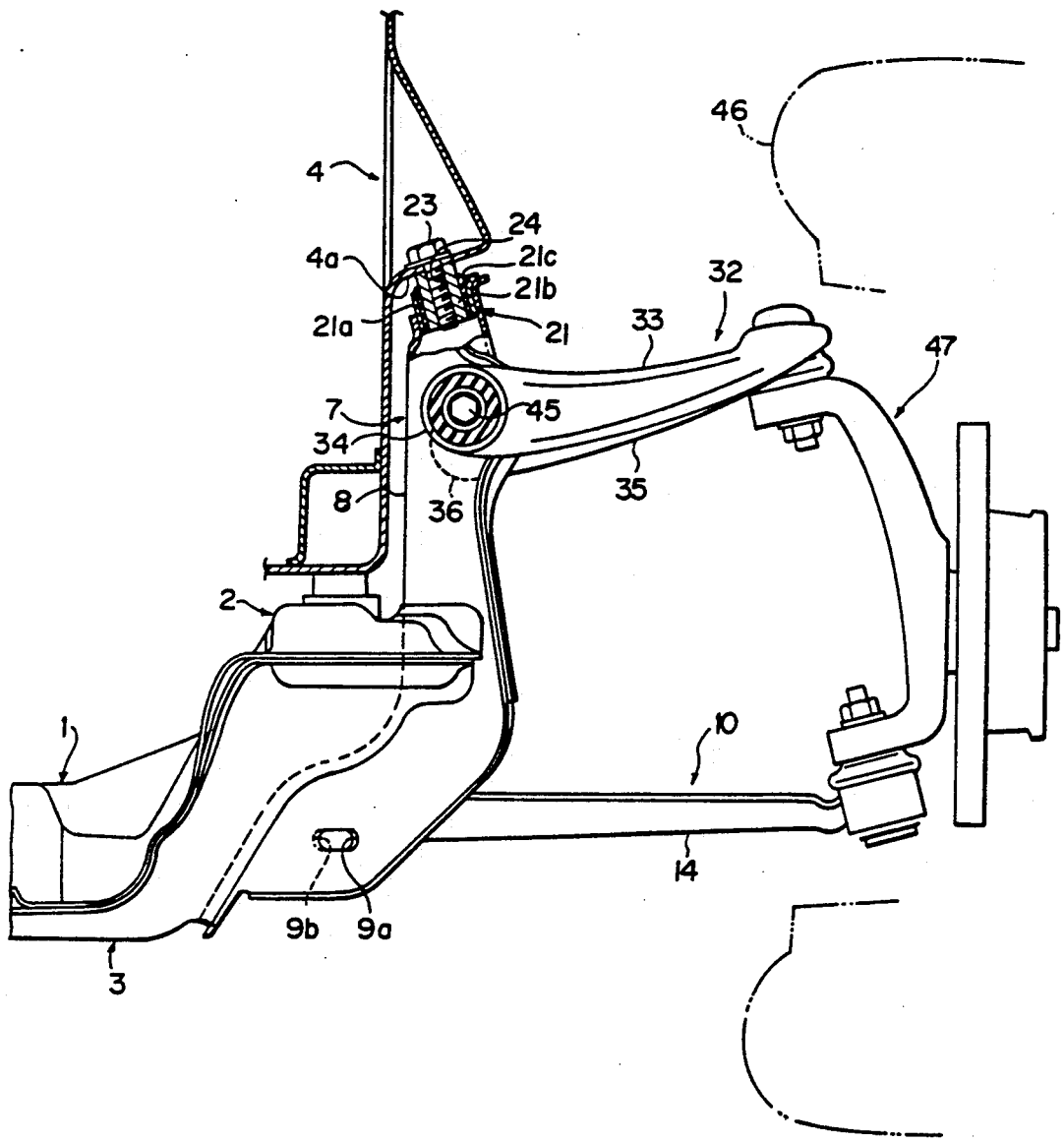
FIG. 1 is a front view showing a vehicle suspension system in accordance with an embodiment of the present invention.

In FIGS. 1 and 2, a front cross member 1 extends in the transverse direction of the vehicle body and is connected to a chassis 4 at a portion deviated from the longitudinal axis of the chassis 4. To one side end of the front cross member 1 is welded a first bracket 2 which is like a hook in cross-section and has an outer side portion extending in the longitudinal direction of the vehicle body. A second bracket 3 which conforms to the first bracket 2 in shape as viewed from above is welded to the lower surface of the first bracket 2. First and second through holes 5 and 6 extend through the first and second brackets 2 and 3 at front and rear end portions thereof. The first and second brackets 2 and 3 are resiliently mounted on the chassis 4 by bolts (not shown) which are inserted into the holes 5 and 6 and tightened on the chassis 4 with an elastic member (not shown) interposed between each bolt and the chassis 4.

A suspension support member 8 is welded to the first and second brackets 2 and 3 at substantially the middle between the first and second through holes 5 and 6. The suspension support member 8 is substantially channel-shaped in cross-section and has an upstanding extension 7 which projects upward. A lower arm 10 is bifurcated at the inner end portion thereof. That is, the inner end portion of the lower arm 10 comprises a first branch arm 11 and a second branch arm 14. Elongated first-branch-arm mounting holes 9a and 9b are formed in the front and rear walls of the suspension support member 8 at the lower end portion thereof. The inner end portion of the first branch arm 11 is mounted between the first-branch-arm mounting holes 9a and 9b by way of a first rubber bushing 12. The first rubber bushing 12 comprises an outer tubular member 12a, an inner tubular member 12b received in the outer tubular member 12a, and an elastic member 12c interposed between the outer and inner tubular members 12a and 12b. The inner end portion of the first branch arm 11 is welded to the outer tubular member 12a of the first rubber bushing 12, and the first rubber bushing 12 is rotatably mounted between the first-branch-arm mounting holes 9a and 9b by a bolt 13 which is inserted into the first-branch-arm mounting holes 9a and 9b and the inner tubular member 12b. The inner end portion of the second branch arm 14 is mounted, by way of a second rubber bushing 16, on a second-branch-arm supporting portion 15 which is formed on the front end portion of the first and second brackets 2 and 3. Like the first rubber bushing 12, the second rubber bushing 16 comprises an outer tubular member 16a, an inner tubular member 16b and an elastic member 16c interposed therebetween. The outer tubular member 16a of the second rubber bushing 16 comprises an outer tubular member 16a, an inner tubular member 16b is fixed to the second-branch-arm supporting portion 15 by a securing bracket 17. The inner end of the second branch arm 14 is provided with a bolt member 18 and the bolt member 18 is inserted into the inner tubular member 16b and secured thereto by a nut, whereby the inner end portion of the second branch arm 14 is resiliently connected for rotation to the second-branch-arm supporting portion 15.

To the upper end portion of the suspension support member 8 is welded a third bracket 20 which conforms to the upper surface of the suspension support member 8 in shape and reinforces the suspension support member 8. A third rubber bushing 21 and a fourth rubber bushing 22 are spaced from each other in the longitudinal direction of the vehicle body and mounted on the upper ends of the suspension support member 8 and the third bracket 20. The third rubber bushing 21 comprises an outer tubular member 21a, an inner tubular member 21b which is longer than the outer tubular member 21a, and an elastic member 21c which is interposed between the outer and inner tubular members 21a and 21b and urges the inner tubular member 21b to project upward. The outer peripheral surface of the outer tubular member 21a is welded to the upper ends of the suspension support member 8 and the third bracket 20. The inner tubular member 21b is provided on its inner peripheral surface with a thread 24. A bolt 23 is screwed into the inner tubular member 21b so that the upper surface of the inner tubular member 21is pressed against a mounting surface 4a of the chassis 4 from below under the resiliency of the elastic member 21c. The fOurth rubber bushing 22 is the same as the third rubber bushing 21 and is mounted on the chassis 4 in the same manner. The suspension support member 8 and the third bracket 20 are thus resiliently mounted on the chassis 4 by way of the third and fourth rubber bushings 21 and 22.

A upper arm 32 is bifurcated at the inner end portion thereof. That is, the inner end portion of the upper arm 32 comprises an upper first branch arm 33 and an upper second branch arm 35. An upper-first-branch-arm mounting hole 30 and an upper-second-branch-arm mounting hole 31 are respectively formed in the front and rear walls of the upstanding extension 7 of the suspension support member 8 and are in alignment with each other. The inner end portion of the upper first branch arm 33 is mounted on the upstanding extension 7 by way of a fifth rubber bushing 34 at the upper-first-branch-arm mounting hole 30, and the inner end portion of the upper second branch arm 35 is mounted on the upstanding extension 7 by way of a sixth rubber bushing 36 at the upper-second-branch-arm mounting hole 31. As shown in FIG. 3, the fifth rubber bushing 34 includes an outer tubular member 34a fixed to the inner end portion of the upper first branch arm 33, and an inner tubular member 34b which is longer than the outer tubular member 34a. A tubular support member 37 is loosely fitted on the inner tubular member 34b to be slidable in the longitudinal direction relative to the inner tubular member 34b and to be rotatable about the same. An elastic member 34c is fixed to the inner peripheral surface of the outer tubular member 34a and the outer peripheral surface of the tubular support member 37. A first spring retainer 39 rests on one end of the outer tubular member 34a to be rotatable about the inner tubular member 34b with a rotatable member 38 intervening between the first spring retainer 39 and the outer tubular member 34a. The first spring retainer 39 is fitted on the inner tubular member 34b at an intermediate portion thereof to be rotatable and slidable in the longitudinal direction of the inner tubular member 34b. A second spring retainer 40 which is like a disk in shape is fixed to the rear end of the inner tubular member 34b so as to oppose to the first spring retainer 39. The first spring retainer 39 has a cranked configuration in cross-section and has outer and inner shoulders, the outer shoulder being near to the second spring retainer 40 than the inner shoulder. An annular rubber stopper 41 which is rectangular in cross-section is fixed to the outer shoulder of the first spring retainer 39 in alignment with the outer portion of the second spring retainer 40. A first coil spring 42 is compressed between the inner shoulder of the first spring retainer 39 and the inner portion of the second spring retainer 40 and urges forward the upper first branch arm 33 (the upper arm 32) by way of the first spring retainer 39, the rotatable member 38 and the outer tubular member 34a of the fifth rubber bushing 34. The first coil spring has a spring constant of K1. A stopper 34d is fixed to the front end portion of the inner tubular member 34b and is adapted to abut against the front end face of the elastic member 34c, thereby limiting the foremost position of the outer tubular member 34a, i.e., the foremost position of the upper arm 32. A rubber dust boot member 43 is fixed to the rear end of the first spring retainer 39 at the outer edge thereof and to the rear end portion of the inner tubular member 34b behind the second spring retainer 40 at the inner edge thereof. The inner peripheral surface of the tubular support member 37 in contact with the outer surface of the inner tubular member 34b and the surface of the first spring retainer 39 in contact with the rotatable member 38 are treated with ethylene tetrafluoride resin so that they can smoothly slide or rotate relative to the surfaces in contact with them. The rubber stopper 41 resiliently limits a rearward movement of the first spring retainer 39 which is made overcoming the force of the first coil spring 42.

The sixth rubber bushing 36 is substantially the same as the fifth rubber bushing 34 though it is directed in the direction reverse to the fifth rubber bushing 34. That is, the sixth rubber bushing 36 comprises an outer tubular member 36a fixed to the inner end portion of the upper second branch arm 35, an inner tubular member 36b, an elastic member 36c, a tubular support member 37, a rotatable member 38, a first spring retainer 39, a second spring retainer 40, a rubber stopper 41, a rubber dust boot member 43, a stopper 36d and a second coil spring 44. The spring constant K2 of the second coil spring 44 which is equivalent to the first coil spring 42 in the fifth rubber bushing 34 is smaller than the spring constant K1 of the first coil spring 42. The second coil spring 44 urges rearward the upper second branch arm 35. The stopper 36d limits the rear most position of the outer tubular member 36a. The fifth and sixth rubber bushings 34 and 36 are connected to the upstanding extension 7 of the suspension support member 8 by means of a long bolt member 45 which is inserted into the inner tubular members 34b and 36b, the upper-first-branch-arm mounting hole 30 and the upper-second-branch-arm mounting hole 31 with the fifth and sixth rubber bushings 34 and 36 being positioned on opposite sides of the upstanding extension 7. Thus, the inner end portions of the upper first branch arm 33 and the upper second branch arm 35 are resiliently and rotatably mounted on the upstanding extension 7 of the suspension support member 8 by way of the fifth and sixth rubber bushings 34 and 36. In the assembled state, the second coil spring 44 is compressed in the sixth rubber bushing 36 with the rubber stopper 41 being in abutment against the second spring retainer 40 and the inner tubular member 36b of the sixth rubber bushing 36 being displaced rearward as shown in FIG. 4 since the spring constant K2 of the second coil spring 44 is smaller than that of the first coil spring 42. The upper branch arms 33 and 35 and the lower branch arms 11 and 14 are mounted on the front cross member 1 before the front cross member 1 is mounted on the chassis 4. The outer ends of the lower arm 10 and the upper arm 32 are connected to a wheel support 47 for supporting a wheel 46.

For example, when the vehicle passes a gap, rearward load acts on the fifth and sixth rubber bushings 34 and 36 by way of the upper arm 32 from the wheel 46, and the upper arm 32 is displaced rearward overcoming the sum of the spring forces of the first and second coil springs 42 and 44, whereby the wheel 46 momentarily escapes rearward and the driving comfort during passage of gaps is improved.

As can be understood from the description above, in the suspension system of this embodiment, the upper arm 32 is urged forward by the first spring 42 disposed in the fifth rubber bushing 34 and rearward by the second spring 44 disposed in the sixth rubber bushing 36. This arrangement is advantageous in that each rubber bushing may be smaller in size when a given spring constant which acts against the rearward displacement of the upper arm 32 is obtained by two coil springs than when the given spring constant is obtained by a single coil spring. Further, if the first and second coil springs 42 and 44 are both arranged to urge forward the upper arm 32 unlike in the embodiment described above, the second coil spring 44 must be positioned on the outer side of the upper second branch arm 35, which is not preferable from the viewpoint of compactly arranging the suspension arm supporting portion. On the other hand, when the coil springs are positioned on the inner side of the upper first branch arm 33 and the upper second branch arm 35, i.e., between the branch arms 33 and 35, and are directed so that they urge the upper arm 32 in opposite directions, and the spring constant of the spring urging forward the upper arm 32 is set to be larger than that of the coil spring urging rearward the upper arm 32 as in the embodiment described above, the upper arm is normally positioned in the foremost position, and the sum of the springs constant K1 and K2 act against rearward displacement of the upper arm 32 from the foremost position.

Further, in the embodiment described above, the upper arm 32 can be displaced rearward and the lower arm 10 cannot be displaced rearward. That is, the driving comfort during passage of a gap can be improved when one of the upper arm and the lower arm is arranged so that it can be displaced rearward. However, if the lower arm 10 can be displaced rearward, the lower arm 10 is displaced rearward when the brake is applied, which causes braking judder. On the other hand, forward load acts on the upper arm when the brake is applied, and accordingly, when the upper arm 32 is supported so that it can be displaced rearward and only rearward while the lower arm 10 is supported so that it cannot be displaced rearward, the driving comfort can be improved and at the same time, the braking judder can be suppressed.

We claim:

1. A suspension system for a vehicle comprising a suspension arm having an outer end portion which is connected to a wheel support for rotatably supporting a wheel and an inner end portion which is bifurcated and comprises first and second branch arms spaced from each other in the longitudinal direction of the vehicle body, a pair of slide members which respectively support the inner end portions of the first and second branch arms so that the inner end portions are slidable relative to the vehicle body in the longitudinal direction of the same, a coil spring which is provided for at least one of the first and second branch arms and urges forward the suspension arm so that said inner end portions of the first and second branch arms can slide rearward in opposition to the coil spring in response to rearward loading input through the wheel which acts on the inner end portion of the suspension arm, and a stopper means which defines the forewardmost position of the suspension arm which is urged forward by said coil spring, wherein said coil spring applies a forward bias force toward and against said stopper, thereby improving the driving comfort when a vehicle passes a gap and rearward loading acts on the inner end of the suspension arm.

2. A suspension system as defined in claim 1 in which a first coil spring is provided so as to urge forward one of the first and second branch arms and a second coil spring is provided so as to urge rearward the other branch arm, the force of the first coil spring being stronger than that of the second coil spring.

3. A suspension system as defined in claim 2 in which said first coil spring has a spring constant larger than that of the second coil spring.

4. A suspension system as defined in claim 2 in which said first coil spring is disposed in front of said one of the first and second branch arms and said second coil spring is disposed on the rear of said the other branch arm.

5. A suspension system as defined in claim 2 in which each of said slide members is slidably fit on an inner tubular member which is fixed to the vehicle body, and each of said inner end portions of the first and second branch arms is fixed to an outer tubular member which is connected with the slide member.

6. A suspension system as defined in claim 5 in which said inner tubular member is longer than the outer tubular member and a coil spring is disposed between one end of the outer tubular member and a spring retainer fixed to one end of the inner tubular member, the assembly of the inner tubular member, the outer tubular member, the slide member and the coil spring for the first branch arm being directed reversely to that for the second branch arm.

7. A suspension system as defined in claim 6 in which said outer tubular member is connected with the slide member by way of an elastic member.

8. A suspension system as defined in claim 7 in which the assembly of said slide member, said elastic member and said outer tubular member is disposed near the end of the inner tubular member remote from the spring retainer, and said coil spring is disposed between the spring retainer fixed to the inner tubular member and a movable spring retainer which is slidably fitted on the inner tubular member between the fixed spring retainer and the outer tubular member, the movable spring retainer comprising a smaller diameter portion and a larger diameter portion and abutting against the outer tubular member under the force of the coil spring at the larger diameter portion with the smaller diameter portion being received in the outer tubular member, and the coil spring extending between the fixed spring retainer and the smaller diameter portion of the movable spring retainer.

9. A suspension system as defined in claim 8 in which a rotatable member which is rotatable relative to the outer tubular member and is slidable along the inner tubular member is interposed between the outer tubular member and the movable spring retainer.

10. A suspension system as defined in claim 9 in which a dust boot is provided between the fixed spring retainer and the movable spring retainer.

11. A suspension system as defined in claim 1 in which said suspension arm is an upper arm.

12. A suspension system as defined in claim 11 in which said upper arm forms a front suspension.

13. A suspension system as defined in claim 1 in which each of said slide members is slidably fit on an inner tubular member which is fixed to the vehicle body, and each of said inner end portions of the first and second branch arms is fixed to an outer tubular member which is connected with the slide member.

14. A suspension system as defined in claim 13 in which said inner tubular member is longer than the outer tubular member and a coil spring is disposed between one end of the outer tubular member and a spring retainer fixed to one end of the inner tubular member.

15. A suspension system as defined in claim 14 in which said outer tubular member is connected with the slide member by way of an elastic member.

16. A suspension system as defined in claim 15 in which the assembly of said slide member, said elastic member and said outer tubular member is disposed near the end of the inner tubular member remote from the spring retainer, and said coil spring is disposed between the spring retainer fixed to the inner tubular member and a movable spring retainer which is slidably fitted on the inner tubular member between the fixed spring retainer and the outer tubular member, the movable spring retainer comprising a smaller diameter portion and a larger diameter portion and abutting against the outer tubular member under the force of the coil spring at the larger diameter portion with the smaller diameter portion being received in the outer tubular member, and the coil spring extending between the fixed spring retainer and the smaller diameter portion of the movable spring retainer.

17. A suspension system as defined in claim 16 in which a rotatable member which is rotatable relative to the outer tubular member and is slidable along the inner tubular member is interposed between the outer tubular member and the movable spring retainer.

18. A suspension system as defined in claim 17 in which a dust boot is provided between the fixed spring retainer and the movable spring retainer.

19. A suspension system for a vehicle comprising a suspension arm having an outer end portion which is connected to a wheel support for rotatably supporting a wheel and an inner end portion which is bifurcated and comprises first and second branch arms spaced from each other in the longitudinal direction of the vehicle body, a pair of slide members which respectively support the inner end portions of the first and second branch arms so that the inner end portions are slidable relative to the vehicle body in the longitudinal direction of the same, a first urging means which urges forward one of the first and second branch arms, a second urging means which urges rearward the other branch arm, the force of the first urging being stronger than that of the second urging means, and a stopper means which defines the foremost position of the suspension arm.

20. A suspension system as defined in claim 19 in which said first urging means is disposed in front of said one of the first and second branch arms and said second urging means is disposed on the rear of said the other branch arm.

21. A suspensions system for a vehicle comprising a suspension arm having an outer end portion which is connected to a wheel support for rotatably supporting a wheel and an inner end portion which is bifurcated and comprises first and second branch arms spaced from each other in the longitudinal direction of the vehicle body, a pair of slide members which respectively support the inner end portions of the first and second branch arms so that the inner end portions are slidable relative to the vehicle body in the longitudinal direction of same, coil spring means provided for at least one of the first and second branch arms, said coil spring means for providing a bias force to urge the suspension arm forward such that the inner ends of said first and second branch arms can slide rearward in opposition to the spring means in response to rearward loading input through the wheel acting on the inner end portion of the suspension arm, said spring means operational at all speeds for providing a bias force in opposition to rearward loading input through the wheel, said suspension system further including stopper means defining forwardmost positioning of the suspension arm whereby driving comfort is improved at all speeds when rearward loading acts upon the suspension arm.

* * * * *